United States Patent [19]

Biggs et al.

[11] Patent Number: 5,410,669
[45] Date of Patent: Apr. 25, 1995

[54] DATA PROCESSOR HAVING A CACHE MEMORY CAPABLE OF BEING USED AS A LINEAR RAM BANK

[75] Inventors: Terry L. Biggs, Dripping Springs; Antonio A. Lagana, Austin, both of Tex.

[73] Assignee: Motorola, Inc., Schaumburg, Ill.

[21] Appl. No.: 43,065

[22] Filed: Apr. 5, 1993

[51] Int. Cl.[6] .............................................. G06F 12/08
[52] U.S. Cl. .............................. 395/425; 364/DIG. 1; 364/243.4; 364/243.41; 364/245
[58] Field of Search ................................. 395/400, 425

[56] References Cited

U.S. PATENT DOCUMENTS 5,067,078 11/1991 Talgam et al. ...................... 395/400

OTHER PUBLICATIONS

Lai, Konrad et al, "Revisit the case for direct-mapped caches: A case for two-way set associative level-two caches", 19th International Symposium on Computer Architecture, May 1992.

*Primary Examiner*—Rebecca L. Rudolph
*Attorney, Agent, or Firm*—Charlotte B. Whitaker

[57] ABSTRACT

A data processing system (10) having a dual purpose memory (14) comprising multiple cache sets. Each cache set can be individually configured as either a cache set or as a static random access memory (SRAM) bank. Based upon the configuration of the set, the tag store array (58) is used for storage of actual data, in the SRAM mode, or for storage of a set of tag entries in the cache mode. A module configuration register (40) specifies the mode of each set/bank. A set of base address registers (41-44) define the upper bits of a base address of SRAM banks. In SRAM mode, comparison logic (66) compares a tag field of the requested address (50) to the base address to determine an access hit. The least significant bit of the address' tag field is used to select either the tag store array (58) or the line array (60) for the requested address data read or write.

7 Claims, 3 Drawing Sheets

DATA PROCESSOR HAVING A CACHE MEMORY CAPABLE OF BEING USED AS A LINEAR RAM BANK

FIELD OF THE INVENTION

This invention is related generally to data processors, and more particularly to data processors having data and instruction cache memories.

BACKGROUND OF THE INVENTION

Many of today's high performance data processing systems suffer from the problem of inefficient usage of cache memory capacity. The inefficiency is largely attributable to the fact that generally different applications achieve desired hit rates when different cache organizations are employed. For some applications, a two-way or direct-mapped cache may be sufficient, therefore, extra cache sets provide only a small increase in the hit rates. For example, if an x-way cache provides a sufficient hit rate, where x=1, then (n−x) cache sets are underutilized (where n is an integer greater than or equal to 2). Accordingly, applications with different hit rate requirements can free cache sets for usage as random access memory (RAM).

Further exacerbating the problem in conventional caches, is the high-overhead associated with usage of a tag store array. Typically, the size of the tag store array required to provided the desired cache hit rate is on the order of two times the number of bytes of actual data stored in a line store array. Consequently, if only "x" sets are required to provide the desired hit rate, then 2(n−x) times the number of bytes of actual data stored in the line store array are wasted. Essentially, each underutilized cache set could potentially provide twice as many bytes of actual information storage if used as a RAM bank. Known data processors provide a mechanism, (i.e. a bit to disable cache filling) which allows the system software to load the cache memory and use the cache memory as a static RAM. This "freeze" bit may allow the processor to disable one cache set at a time. Thus, it is desirable to provide a cache memory which overcomes the foregoing problems.

SUMMARY OF THE INVENTION

A data processing system has a processor, and a memory which stores a plurality of data entries at a predetermined number of memory addresses. The memory uses a tag field of a requested memory address provided by the processor, via a communications bus, to access a selected data entry stored in the memory. The memory has a predefined number of storage sets, each of which is individually configured to operate as either a cache memory, or as a static random access memory, in response to a mode select value stored in a control register. Each storage set has a first array which stores a predetermined number of tag entries, in a cache mode of operation, and selectively stores a predetermined number of data entries, in an SRAM mode of operation, and a second array which stores the plurality of data entries. Mode select bits in a control register indicate the configuration of each storage set, as either a cache memory or an SRAM. Selection logic is connected to each storage set. In response to a mode select bit having a first logic value, the selection logic compares the tag field of the requested memory address to a memory bank base address of the storage set, in the SRAM mode of operation, to determine an access "hit" in the memory. When an access hit occurs, the selection logic uses a predetermined bit in the requested address to select either the first array or the second array to be accessed in response to a requested address data read or write by said processor.

DETAILED DESCRIPTION OF A PREFERRED EMBODIMENT

Figure 1:
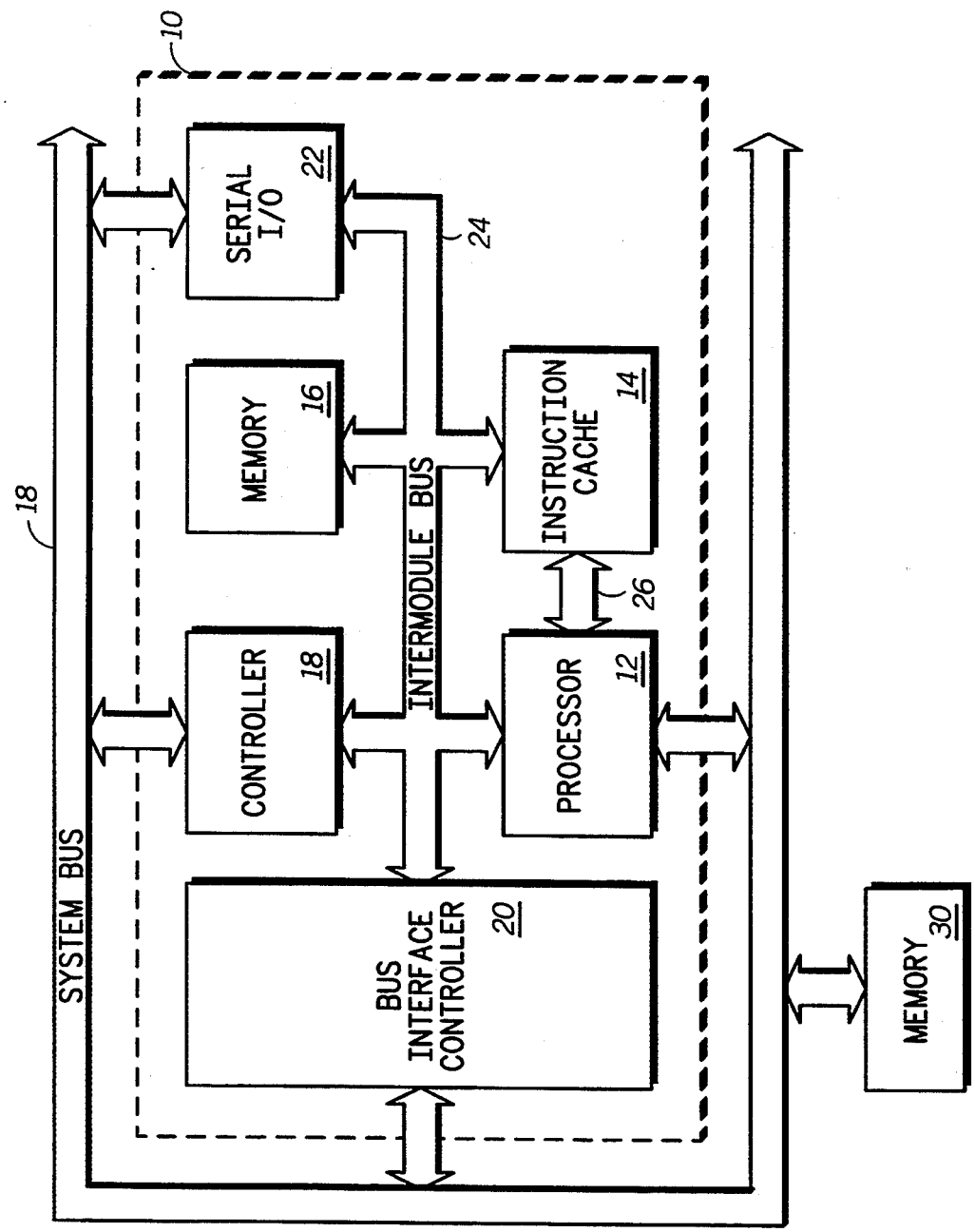
FIG. 1 illustrates in block diagram form, a data processing system having a cache memory module capable of being used as a linear RAM bank, in accordance with the present invention.

Illustrated in FIG. 1 is a block diagram of a data processing system 10 for use in accordance with a preferred embodiment of the present invention. In the preferred embodiment, data processing system 10 comprises six modules which communicate via an intermodule bus 24 or directly to an external system (not shown). In accordance with the preferred embodiment, the IMB 24 consists of seven signal groups, which include address, data, control, mastership, interrupt, reset and debug. The protocol for the IMB 24 allows each module to monitor bus activities to thereby ascertain which module will be the next bus master. An instruction processing module (processor) 12 is connected to a dual purpose instruction cache module 14, via an internal communications bus 26. A second memory module 16 is a 4096 byte static random access memory, and is coupled to the IMB 24. The memory 16 is organized as 4×1024 bytes blocks, and each of the four blocks has its own associated Base Address Register (not shown) to allow a user to program the memory blocks to operate out of different portions of the memory map. Accordingly, in the preferred embodiment, each memory block may be located anywhere within a 4-Gbyte address range of the memory map.

A dual channel direct memory access (DMA) controller 18 supports 32-bits of both address and data. A dual serial input/output module 22 consists of two fully independent universal asynchronous receiver transmitter (UARTS). In the preferred embodiment, each channel of the dual serial module 22 has a maximum transfer rate of 4 MBps in a synchronous mode. In accordance with the preferred embodiment, the bus interface controller 20 provides the basic interface between the various modules of data processing system 10 and the external system environment, including memory 30, via a system bus 28. The bus interface controller 20 includes certain resources that are used across the entire data processing system 10. The first of these resources is the base address of the Module Map. Essentially, all of the internal registers, including those of the bus interface controller 20, are located in a 4-Kbyte block in the bus interface controller 20. The base address of this 4-Kbyte block is programmable and resides in the addressing space of the processor 12.

Figure 2:
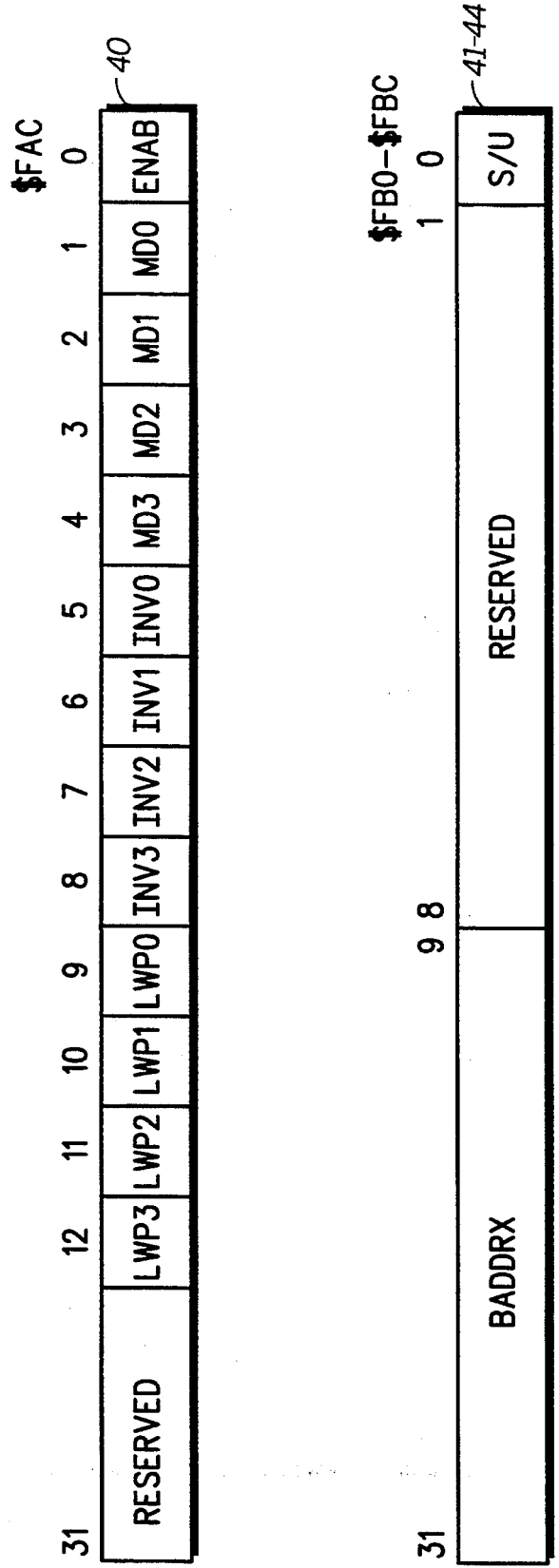
FIG. 2 illustrates, in block diagram form, a programmer's model of a set of registers in the cache memory module of the present invention.

In the present invention, the instruction cache module 14 is a dual purpose module that can be used as a combination 1K-byte instruction cache and static random access memory (hereinafter referred to as the "instruction cache/SRAM module 14") for the processor 12. When used as an SRAM, the instruction cache 14 provides a fast memory for general storage of processor instructions and/or data. Accordingly, the instruction cache module/SRAM 14 may be configured to operate in a "dual" mode where a portion of the module 14 functions as an instruction cache ("I-cache mode"), and the remainder as an SRAM ("SRAM mode"). In accordance with the present invention, a programmer's model (register map) of all registers in the instruction cache/SRAM module 14 is illustrated in FIG. 2. In FIG. 2, the number in the upper right hand corner indicates the offset of the register from the address stored in the module base address register. The numbers on the top right hand line of the register represent the bit position in the register. The second line contains the mnemonic for the bit. The numbers below the register represent the bit values after reset. Accordingly, in a preferred embodiment, the module configuration register (MCR) 40 controls the configuration of the instruction cache/SRAM module 14. The MCR 40 may be read or written in the supervisor state.

Lock/Write-Protect Bits (LWP0-LWP3)

In I-Cache mode, the LWP bits indicate the lock status of corresponding sets. Thus, when a LWP bit is a logic "1", the set is locked and no lines will be replaced. Alternatively, when the bit is a logic "0", the set is not locked, and lines may be replaced during cache misses or loads. In SRAM mode, the LWP bits indicate the write-protect status of corresponding SRAM banks. Accordingly, when an LWP bit is a logic "1", the SRAM bank is writeprotected, therefore, only read accesses are allowed. An attempt to write to the SRAM bank returns a bus error signal. If the LWP bit is a logic "0", the SRAM bank is not write-protected.

Invalidate Bits for I-Cache Sets (INV0-INV3)

The INV bits provide a way to invalidate the entire contents of sets in the instruction cache/SRAM module 14. These bits are write-only and any read attempts will return a "0". When an INV bit is written a logic "1", all lines in the corresponding set will be invalidated, therefore, a subsequent cache read access Hill result in a "miss". The cache lines' valid status is given by the individual valid (V) bits 62 of each line.

I-Cache/SRAM Mode Bits (MD0-MD3)

The MD bits are used to specify the mode of corresponding sets/banks of the instruction cache/SRAM module 14. When an MD bits is a logic "1", the corresponding set in the instruction cache/SRAM module 14 is in SRAM mode. Conversely, when an MD bit is a "0", the corresponding set in the instruction cache/SRAM module 14 is in I-Cache mode.

Module Enable Bit (ENAB)

The instruction cache/SRAM module 14 is enabled when this bit is set ("1"), and disabled when this bit is cleared ("0").

SRAM Base Address Registers 0-3 (BADDR0-3)

The base address field (BADDRX) of the SRAM Base Address Registers 41-44 defines the upper 23 bits of the base address of the SRAM banks in the instruction cache/SRAM module 14. This field is only used when the corresponding cache set is put into the SRAM mode. As previously indicated, a Supervisor/User Space (S/U) bit identifies the SRAM bank as supervisor access only or supervisor/user space access. Accordingly, when the S/U bit is set ("1"), the bank is supervisor access only. Alternatively, when the S/U bit is cleared ("0"), the bank is supervisor/user accessible.

Figure 3:
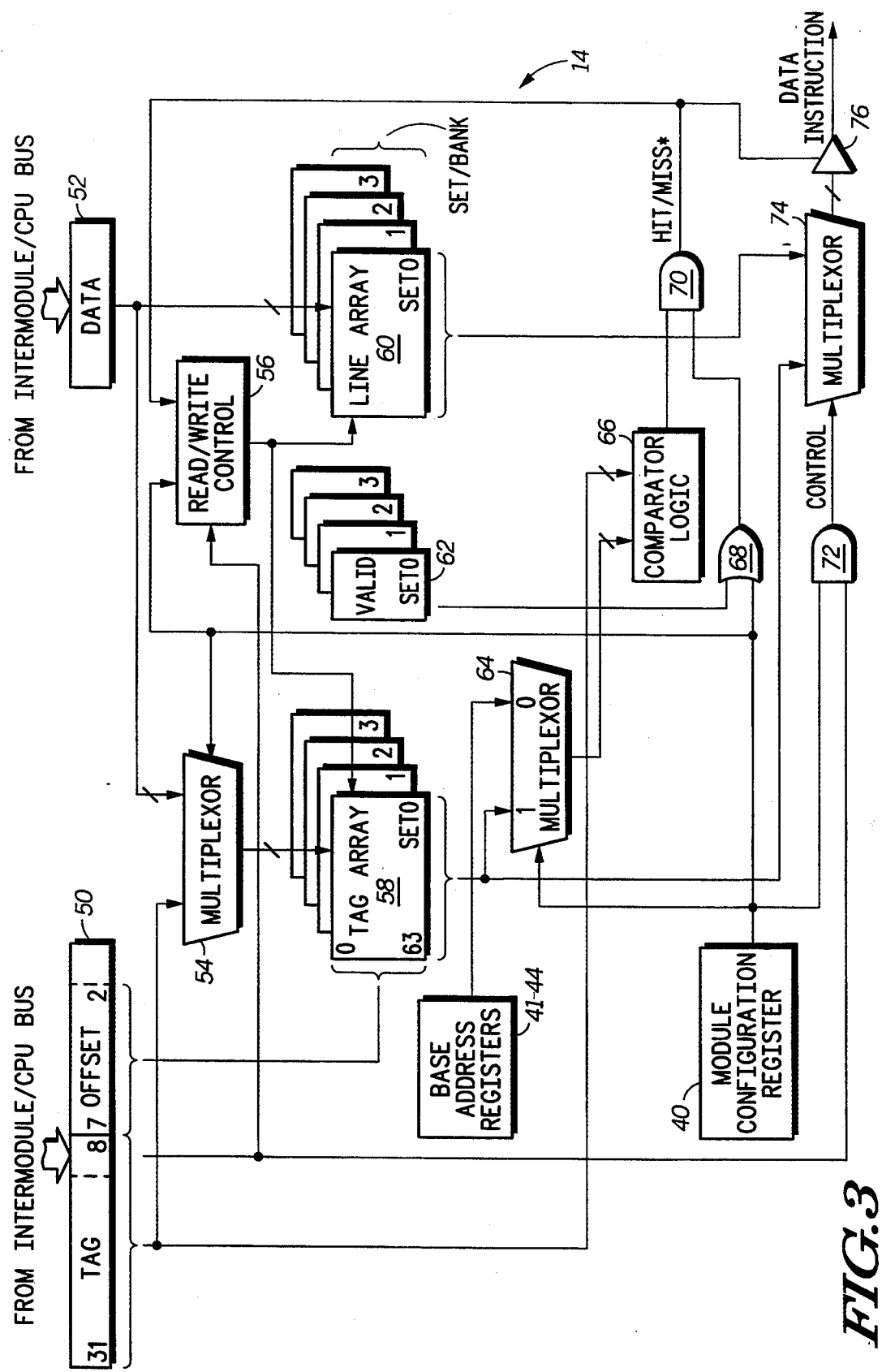
FIG. 3 illustrates, in block diagram form, the cache memory of the present invention.

Illustrated in FIG. 3 is a block diagram of the instruction cache module 14 of the present invention. In accordance with a preferred embodiment of the present invention, in the I-Cache mode, the instruction cache/SRAM module 14 is organized as a set-associative instruction cache with four sets (Set 0-3) of sixty-four lines each. As previously indicated, the module configuration register 40 indicates when the instruction cache/SRAM module 14 is in the I-Cache mode. Each cache line contains an address tag (TAG) which is stored in a tag array 58, status information consisting of a valid ("V") bit 62 per word, and four bytes of instruction information (LINE) stored in a line array 60. The address tag contains the upper 24-bits of the physical address. In operation, when the processor 12 makes an instruction fetch request, the instruction cache/SRAM module 14 uses six bits (A7-A2) of an address 50, provided via the processor bus 26, as an offset to index into the tag array 58 to select one of the sixty-four lines. Comparator logic 66 compares the tags from the selected cache lines, provided via a multiplexor 64, against the physical address bits A31-A8. If any one of the tags match and the line status is valid, as indicated by the OR-gate 68, then the AND-gate 70 indicates a cache "hit". When a cache hit occurs, the read/write control logic 56 enables the requested instruction (data entry) to be read from the line array 60 to the multiplexor 74. The AND-gate 72 provides a CONTROL signal to control the operation of a multiplexor 74. Accordingly, the requested instruction is transferred to the processor 12, via the buffer 76. When the AND-gate 70 indicates the occurrence of a cache "miss", the bus interface controller 20 requests the memory line containing the required instruction from the external memory 30, and the line is loaded into the instruction cache/SRAM module 14, via the IMB 24. Accordingly, the read/write control logic 56 receives the "miss" control signal from AND-gate 70 and enables the data entry 52 corresponding the requested instruction to be loaded into the line array 60, via the IMB 24.

In the preferred embodiment of the present invention, each of the four sets in the instruction cache/SRAM module 14 may be used as a 512-byte SRAM accessible only by the processor 12, via the processor (CPU) bus 26. Accordingly, each SRAM bank (cache set) is relocatable along 512-byte boundaries, and each set's operating mode (I-Cache or SRAM) is independent of the operating mode of the other sets. The entire contents of a memory bank (cache set) may be write-protected by setting the LWP bit in the module configuration register (MCR) 40. In the present invention, the key difference between the SRAM configuration and the conventional cache configuration lies in the use of the Base Address Register (BADDR) 41 and related hardware to select either a tag store entry or a user specified base address, stored in the Base Address Register 41, to match against the requested address 50. Thus, if a set is being used as a RAM bank (as determined by the Set Mode (MD) bits in the Module Configuration Register 40), the TAG field of requested address 50 is compared against the Base Address Register 41, by the comparator logic 66, to determine an access "hit".

In SRAM-mode, when an access "hit" occurs, AND-gate 72 uses the least significant bit of the TAG field (Bit 8) of the requested address 50 to select either the tag array 58 or the line array 60 for the requested address data read or write. In the case of a read "hit" access, the AND-gate 70 provides the "hit" signal to the read/write control logic 56 to enable the requested data to be read from either the tag array 58 or the line array 60, as the case may be. When the requested access is a data write, the read/write control logic 56 enables the data 52 to be written into either the tag array 58 or the line array 60, from the CPU bus 26. When an access "miss" occurs (in SRAM mode), the requested data is retrieved from other resources (i.e. external memory 30) in data processing system 10. Thus, in SRAM mode, each bank has double the data storage capacity of a set in I-Cache mode. This creates a trade-off between caching randomly scattered data and instructions versus being able to hold twice the amount of data and instructions in a contiguous range of memory. The present invention increases the data storage capacity by using the tag array 58 as RAM in addition to the line array 60. This results in increased RAM capacity and improved tag memory cell utilization when a cache set is used as RAM.

Thus, in accordance with the present invention, the instruction cache module 14 may be user-configured as x-way set-associative, where $0 \leq x \leq n$, where n is the number of sets. Each set is individually configured as either a set of M-byte capacity or as a RAM bank of 2M-byte capacity, where M is the number of bytes/set. This allows the system designer or operating system to choose the desired associativity for specific applications "on the fly" while leaving the remaining sets usable as fast, general purpose, relocatable RAM. Furthermore, the present invention provides increased functionality and flexibility by providing the ability to keep often used contiguous instruction and data in fast RAM memory without the storage overhead incurred by the tag store in conventional unified data and instruction caches.

While the present invention has been described in accordance with a preferred embodiment, it should be apparent to one of ordinary skill in the art that the invention may be practiced in numerous ways. For example, in an alternate embodiment, there could be a Base Address Register for the tag array 58, and one for the line array 60, thereby splitting the instruction cache 14 into two independently relocatable RAM banks. Accordingly, it is intended by the appended claims to cover all modifications of the invention which fall within the true spirit and scope of the invention.

We claim:

1. In a data processing system having a processor, and a memory for storing a plurality of data entries at a predetermined number of memory addresses, and said memory uses a tag field of a requested memory address provided by said processor, via a communications bus, to access a selected data entry stored in said memory, said memory comprising:

first means comprising a predefined number of cache sets, each cache set being independently configured to operate as either a cache memory, or as a static random access memory, in response to a mode select value stored in a control register, and each set having a memory bank base address when operating as said SRAM, said first means comprising for each cache set:

a first array for storing a predetermined number of tag entries, in a cache mode of operation, and for selectively storing a predetermined number of data entries, in an SRAM mode of operation;

a second array, coupled to said communications bus, for storing said plurality of data entries; and, second means coupled to said first means for selectively comparing, in response to said mode select value being a first logic state, said tag field of said requested memory address to said memory bank base address of each cache set stored in a base address register, in said SRAM mode of operation, to determine an access "hit" in said memory, in response to detecting said access hit said second means uses a predetermined bit in said requested address to select either said first array or said second array to be accessed in response to a requested address data read or write by said processor.

2. The memory of claim 1 wherein said second means selectively compares said tag field of said requested memory address to a selected set of tag entries stored in said first array, in response to said mode select value being a second logic state, to determine a cache "hit" in said memory, in said cache mode of operation, said second means determining whether said requested memory address data read or write matches an address stored in said memory.

3. The memory of claim 2 wherein said second means comprises:

first selection means coupled to said base address register and said first memory array for selecting either said base address or a tag entry to be compared with said tag field of said requested memory address, in response to said mode select value stored in said module control register;

comparator means, coupled to said first selection means, for comparing said selected set of tag entries to said tag field of said requested address, in said cache mode of operations, and for comparing said base address to said tag field of said requested address, in said SRAM mode of operation, and providing a control signal representative of a result of each comparison; and second selection means, coupled to first means, for selecting either said first array or said second array to be accessed in response to said requested address data read or write by said processor, said second selection means using said predetermined bit in said requested address to select either said first array or said second array to be accessed, in said SRAM mode of operation.

4. A data processing system having a processor, an n-way set associative memory, where n is an integer value representing a number of cache sets in said memory, said memory storing a plurality of data entries at a predetermined number of memory addresses, and using a tag field of a requested memory address provided by said processor, via a communications bus, to access a selected location in one of said cache sets, said memory comprising:

first means, coupled to said communications bus, said first means having for each one of said sets in said memory a first array for selectively storing either a predetermined number of tag entries or a predetermined number of data entries, and a second array for storing said plurality of data entries, each one of said sets in said memory being individually configured to operate as either a cache memory or as a static random access memory (SRAM), in response to a value stored in a control register; and, second means coupled to said first means for selectively comparing, in response to said value stored in said control register being a first logic state, said tag field of said requested memory address to a selected set of tag entries stored in said first array, for each set in said first means configured to operate as cache memory, to determine a cache "hit", said second means selectively comparing said tag field of said requested address to a base address stored in a base address register, for each set in said first means configured to operate as SRAM memory, to determine an access "hit", in response to detecting said access hit, and said second means using a predetermined bit in said requested address to select either said first array or said second array to be accessed in response to a requested address data read or write by said processor.

5. The memory of claim 4 wherein said second means comprises:

first selection means coupled to said base address register and said first array for selecting either said base address or a selected tag entry to be compared with said tag field of said requested memory address, in response to said mode select value stored in said control register;

comparator means, coupled to said first selection means, for selectively comparing said selected tag entry to said tag field of said requested address, for each set configured as cache memory, and for comparing said base address to said tag field of said requested address, for each set configured as SRAM memory, and providing a control signal representative of a result of each comparison; and second selection means, coupled to said first means, for selecting either said first array or said second array to be accessed in response to said requested address data read or write by said processor, said second selection means using said predetermined bit in said requested address to select either said first array or said second array to be accessed, in said SRAM mode of operation.

6. A data processing system having a processor, and a cache memory for storing a plurality of data entries at a predetermined number of memory addresses, said cache memory using a tag field of a requested memory address provided by said processor, via a communications bus, to access a selected data entry stored in said cache memory, said cache memory comprising:

first means coupled to said communications bus, said first means comprising a predetermined number of storage banks, each of said storage banks being selectively configured to individually operate in a cache mode, or in a static random access memory (SRAM) mode, in response to a mode select value stored in a control register, said first means comprising a first array for storing a predetermined number of tag entries, in said cache mode, and for storing a predetermined number of data entries, in said SRAM mode, and a second array for storing said predetermined number data entries; and, second means coupled to said first means for comparing, in response to said mode select value being a first logic state, said tag field of said requested memory address to a base address for said storage bank stored in a base address register, in said SRAM mode of operation, to determine an access "hit" in said cache memory, in response to detecting said access hit said second means using a predetermined bit in said requested address to select either said first array or said second array to be accessed for said selected data entry in response to a requested address data read or write by said processor; and third means coupled to said second means for transferring said selected data entry to said processor, via said communications bus.

7. The cache memory of claim 6 wherein said second means comprise:

first selection means coupled to said base address register and said first array for selecting either said base address or a selected tag entry to be compared with said tag field of said requested memory address, in response to said mode select value stored in said control register;

comparator means, coupled to said first selection means, for selectively comparing said selected tag entry to said tag field of said requested address, for each set configured as cache memory, and for comparing said base address to said tag field of said requested address, for each set configured as SRAM memory, and providing a control signal representative of a result of each comparison; and second selection means coupled to said first means for selecting either said first array or said second array to be accessed in response to said requested address data read or write by said processor, said second selection means using said predetermined bit in said requested address to select either said first array or said second array to be accessed, in said SRAM mode of operation.

* * * * *